US009524466B2

(12) United States Patent
Amid et al.

(10) Patent No.: US 9,524,466 B2
(45) Date of Patent: Dec. 20, 2016

(54) AUTOMATED MULTI-OBJECTIVE SOLUTION SELECTION

(71) Applicant: International Business Machines Corporation, Armonk, NY (US)

(72) Inventors: David Amid, Kiryat Ata (IL); Ateret Anaby-Tavor, Givat Ada (IL); Shahar Chen, Haifa (IL); Oded Margalit, Ramat Gan (IL); Ofer Shir, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 14/305,009

(22) Filed: Jun. 16, 2014

(65) Prior Publication Data
US 2015/0363703 A1    Dec. 17, 2015

(51) Int. Cl.
G06N 7/00    (2006.01)
(52) U.S. Cl.
CPC ...................... G06N 7/00 (2013.01)
(58) Field of Classification Search
CPC .......................................................... G06N 7/00
See application file for complete search history.

(56) References Cited

U.S. PATENT DOCUMENTS

| 5,307,903 | A  | * | 5/1994  | Morita ................. B66B 1/18 187/380 |
| 7,536,364 | B2 |   | 5/2009  | Subbu et al. |
| 7,593,834 | B2 |   | 9/2009  | Levitan et al. |
| 7,664,622 | B2 |   | 2/2010  | Ruetsch |
| 7,742,902 | B1 |   | 6/2010  | Ruetsch |
| 7,979,365 | B2 | * | 7/2011  | Goldberg ............. G06N 99/005 706/13 |
| 8,041,545 | B2 |   | 10/2011 | Sevastyanov et al. |
| 2005/0143845 | A1 | * | 6/2005  | Kaji ................... G05B 13/0265 700/28 |
| 2007/0005313 | A1 | * | 1/2007  | Sevastyanov ........... G06F 17/11 703/2 |
| 2008/0234994 | A1 | * | 9/2008  | Goebel ............... G06F 17/5009 703/7 |
| 2008/0312895 | A1 | * | 12/2008 | Sastry ................... G06F 19/701 703/12 |

(Continued)

OTHER PUBLICATIONS

Multiple Criteria Analysis of Discrete Alternatives with a Simple Preference Specification: Pairwise-outperformance based Approaches, by Granat, published 2009.*

(Continued)

*Primary Examiner* — Stanley K Hill
*Assistant Examiner* — Thomas Fink
(74) *Attorney, Agent, or Firm* — Ziu Glazeberg

(57) ABSTRACT

A method, apparatus and product for automated multi-objective solution selection. The method comprises obtaining a set of solutions to a multi-objective problem, wherein each solution is a non-dominated solution. The method further comprises computing outranking weights for each pair of solutions and selecting a subset of the set of solutions based upon a defensive criteria in with respect to the outranking weights, wherein the defensive criteria relates to a number of solutions that outrank the subset. The method further comprises outputting the subset of the set of solutions.

19 Claims, 2 Drawing Sheets

(56) References Cited

U.S. PATENT DOCUMENTS

Figure 1:
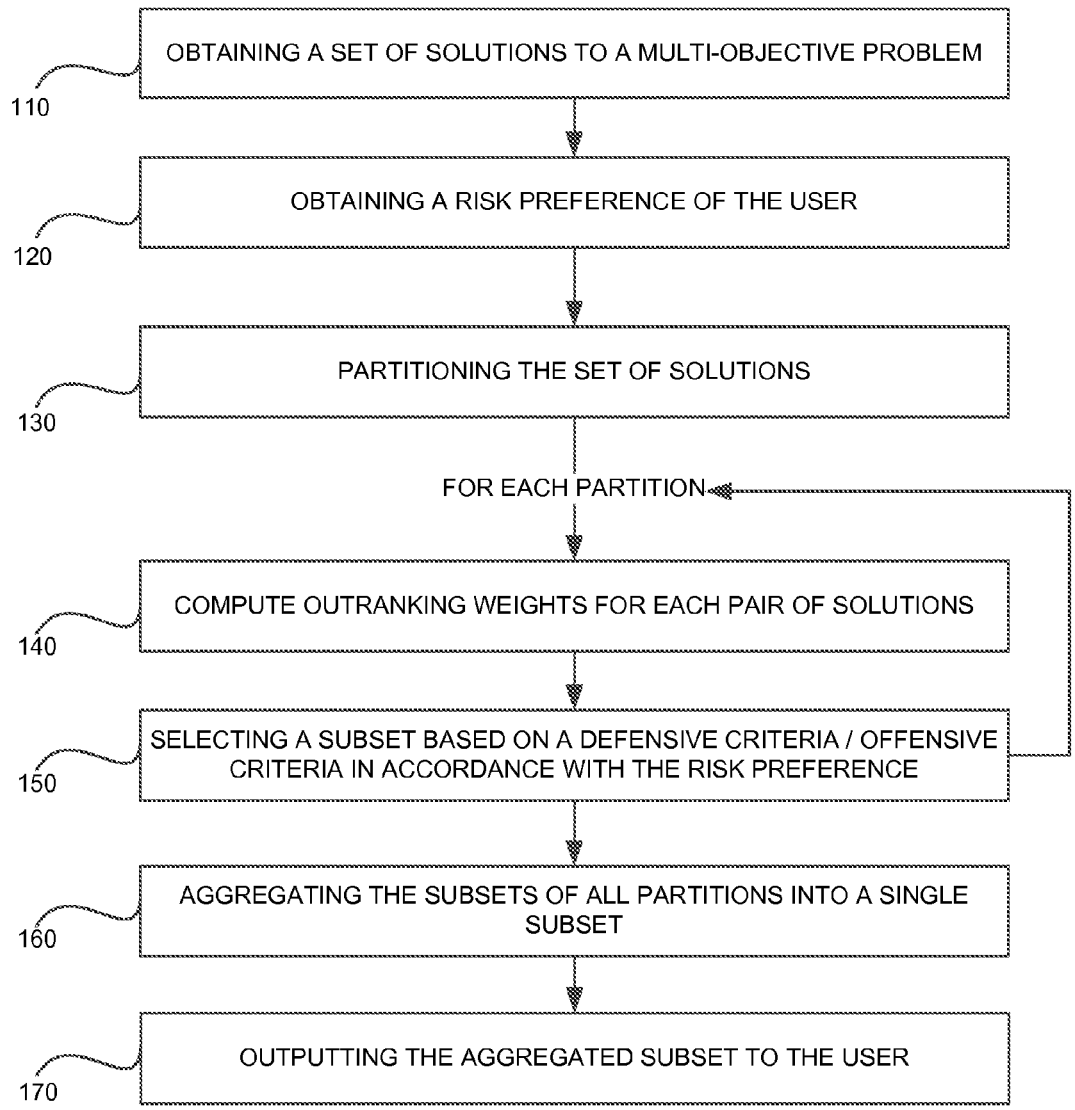

| | | | |
|---|---|---|---|
| 2009/0037150 A1* | 2/2009 | Craft | G06F 19/3437 703/1 |
| 2012/0226654 A1 | 9/2012 | Waldock et al. | |
| 2013/0197878 A1* | 8/2013 | Fiege | A61N 5/1031 703/2 |
| 2013/0218526 A1 | 8/2013 | Lev et al. | |
| 2013/0273514 A1* | 10/2013 | Tambe | G09B 5/00 434/219 |

OTHER PUBLICATIONS

Multiple criteria decision making approaches to assessing forest sustainability using criteria and indicators: a case study, by Mendoza, published 2000.*

The Outranking Approach and the Foundations of Electre Methods, by Roy, published 1991.*

Estimating the Weights for Multiple Attributes in a Composite Criterion Using Pairwise Judgments, by Srinivasin, published 1973.*

U.S. Army Corps of Engineers Institute for Water Resources IWR Planning Suite MCDA Module User's Guide, published 2012.*

Hu et al., "Calculating Complete and Exact Pareto Front for Multiobjective Optimization: A New Deterministic Approach for Discrete Problems", IEEE Transactions on Cybernetics, vol. 43, No. 3, Jun. 2013, pp. 1088-1101.

O'Mahony et al., "Sorted Pareto Dominance: An Extension to Pareto Dominance and Its Application in Soft Constraints", IEEE 24th International Conference on Tools with Artificial Intelligence (ICTAI), Nov. 2012, pp. 798-805.

Sudeng et al., "Adaptive geometric angle-based algorithm with independent objective biasing for pruning Pareto-optimal solutions", Science and Information Conference (SAI), Oct. 2013, pp. 514-523.

Barberis, Nicholas C., "Thirty Years of Prospect Theory in Economics: A Review and Assessment", Journal of Economic Perspectives, vol. 27, No. 1, Winter 2013, pp. 173-196.

Ehrgott Matthias, "Multicriteria Optimization", second edition, Springer, Berlin, 2005.

Farina et al., "Fuzzy Optimality and Evolutionary Multiobjective Optimization", In Evolutionary Multi-Criterion Optimization, Lecture Notes in Computer Science vol. 2632, Springer Berlin, Heidelberg, 2003, pp. 58-72.

Kahneman et al., "A. Prospect Theory: An Analysis of Decision Under Risk", Econometrica, vol. 47, No. 2, Mar. 1979, pp. 263-291.

Das I., "A preference ordering among various Pareto optimal alternatives", Structural Optimization vol. 18, Issue 1, pp. 30-35, Aug. 1999.

Bernard Roy, "The Outranking Approach and the Foundations of ELECTRE Methods", Theory and Decision, vol. 31, issue 1, Jul. 1991, pp. 49-73.

Stuart P. Lloyd, "Least squares quantization in pcm", IEEE Transactions on Information Theory, vol. 28, No. 2, Mar. 1982, pp. 129-137.

Mattson et al., "Smart Pareto Filter: Obtaining a Minimal Representation of Multiobjective Design Space", Engineering Optimization vol. 36, No. 6, Dec. 2004, 721-740.

Thomas L. Saaty, "The Analytic Hierarchy Process: Planning, Priority Setting, Resource Allocation", McGraw-Hill, 1980.

* cited by examiner

AUTOMATED MULTI-OBJECTIVE SOLUTION SELECTION

TECHNICAL FIELD

The present disclosure relates to support systems for multi-objective decision making in general, and to selection of a subset of solutions to the multi-objective problem, in particular.

BACKGROUND

A multi-objective decision is a decision that is made based on multiple objectives. As an example, consider selecting which car one would like to purchase. There may be several different criterions that may affect the decision, such as a price of the car, comfort, safety and fuel economy. In a multi-objective problem, there may be several solutions that are all considered Pareto optimal as they are preferable over other Pareto optimal solutions in at least one objective. Referring to the car example and assuming two criterions, a first solution in which the price is 10K USD and safety is 5 may be considered preferable over a second solution in which the price is 12K USD and safety is 5. However, a third solution in which the price is better but the safety criterion is worse, such as price 8K USD and safety 4, is not in itself preferable over the first solution. In order to decide between one may need to define preferences between the different objectives.

Identification of Pareto optima solutions, also referred to as efficient frontier, may be referred to as Multi-Criterion Decision Making (MCDM). The solution of the MCDM may typically be driven by a human Decision-Maker (DM), who may choose a solution from the efficient frontier based upon their personal preferences. Though attempts have been made to formalize the user's preference so as to allow automatic selection of the optimal solution out of the efficient frontier for a specific user, studies have shown that people rarely succeed in formulating their preferences. In addition, the selection is sometimes affected by physiological biases or other factors, which may not necessarily be rationale and may not adhere to a declared preference of the user.

BRIEF SUMMARY

One exemplary embodiment of the disclosed subject matter is a computerized apparatus having a processor, the processor being adapted to perform the steps of: obtaining a set of solutions to a multi-objective problem, wherein each solution is a non-dominated solution; computing outranking weights for each pair of solutions; selecting a subset of the set of solutions based upon a defensive criteria in with respect to the outranking weights, wherein the defensive criteria relates to a number of solutions that outrank the subset; and outputting the subset of the set of solutions.

Another exemplary embodiment of the disclosed subject matter is a method comprising: obtaining a set of solutions to a multi-objective problem, wherein each solution is a non-dominated solution; computing, by a processor, outranking weights for each pair of solutions; selecting a subset of the set of solutions based upon a defensive criteria in with respect to the outranking weights, wherein the defensive criteria relates to a number of solutions that outrank the subset; and outputting the subset of the set of solutions.

Yet another exemplary embodiment of the disclosed subject matter is a computer program product comprising a computer readable storage medium retaining program instructions, which program instructions when read by a processor, cause the processor to perform a method comprising: obtaining a set of solutions to a multi-objective problem, wherein each solution is a non-dominated solution; computing outranking weights for each pair of solutions; selecting a subset of the set of solutions based upon a defensive criteria in with respect to the outranking weights, wherein the defensive criteria relates to a number of solutions that outrank the subset; and outputting the subset of the set of solutions.

THE BRIEF DESCRIPTION OF THE SEVERAL VIEWS OF THE DRAWINGS

Figure 2:
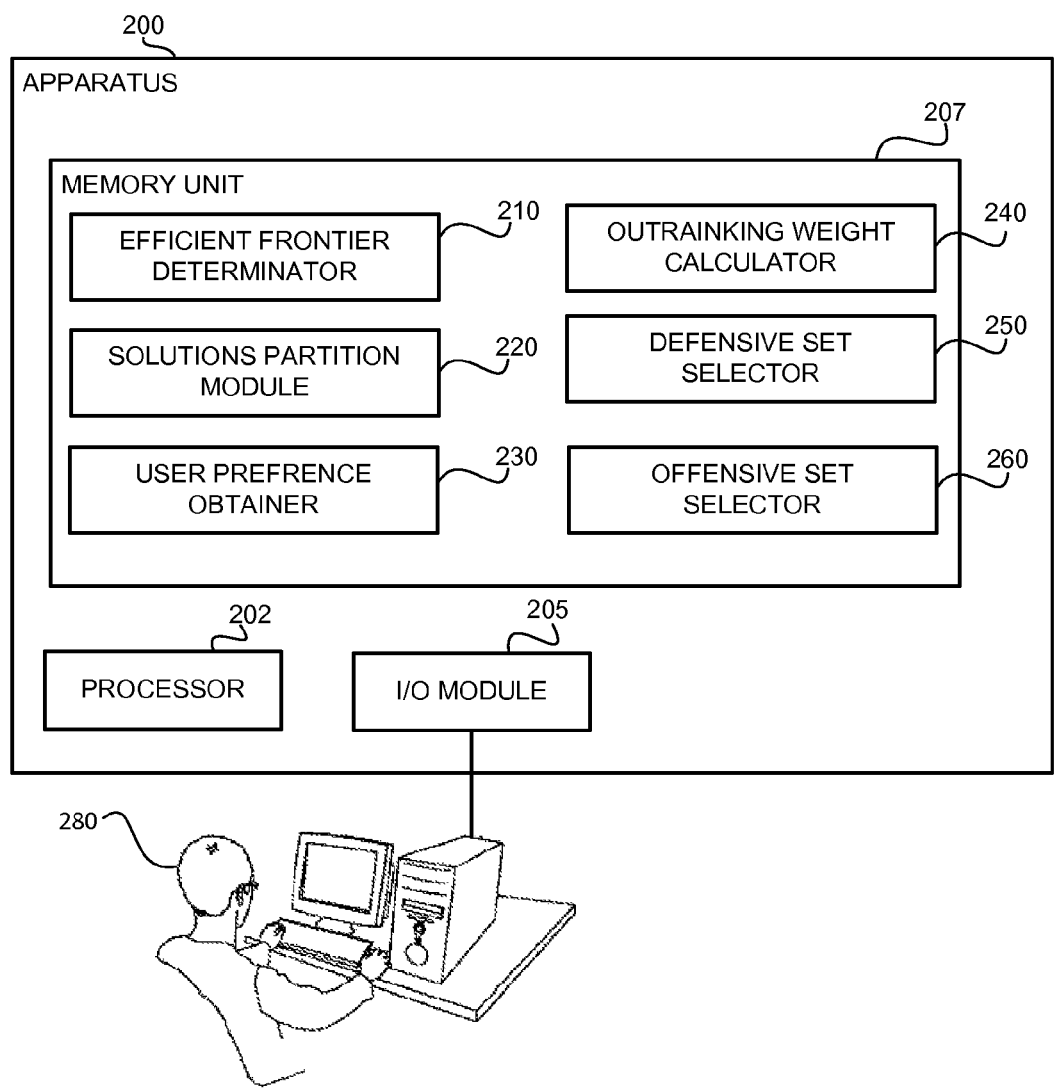

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 1 shows a flowchart diagram of a method, in accordance with some exemplary embodiments of the disclosed subject matter; and FIG. 2 shows a block diagram of an apparatus, in accordance with some exemplary embodiments of the disclosed subject matter.

DETAILED DESCRIPTION

A potential solution to an m objective problem is denoted as f. the solution f may be a vector of m coordinates, each corresponding to a different objective: $f=(f_1, f_2, \ldots, f_m)$. A first solution $f^i$ dominates a second solution $f^j$, noted as $f^j \preceq f^i$, if every coordinate of $f^i$ is the same or better than the corresponding coordinate of $f^j$ (e.g. $\forall k: f_k^j \leq f_k^i$). $f^i$ may strictly dominate $f^j$, denoted as $f^j \prec f^i$, if $f^i$ dominates $f^j$ and $f^i$ has at least one coordinate in which it is preferable over $f^j$ (e.g., $\exists k: f_k^j < f_k^i$). A non-dominated solution, i.e., a solution which is not strictly dominated by any other solution, may be referred to as a Pareto optimal solution. The set of Pareto optimal solutions may be an efficient frontier. MCDM system may be configured to automatically identify the efficient frontier.

One technical problem dealt with by the disclosed subject matter is to select a subset of solutions out of the efficient frontier. The selection may be automatic and may be performed in order to assist the user in selecting a solution. In some cases, MCDM system may provide a large set of potential solutions and it may be difficult for the user to grasp all the different options and make his or her selection therefrom. By automatically filtering some of the solutions, manual selection by the user may be improved as he or she may have better grasp of the potential options. In some exemplary embodiments, the selection may be performed without knowledge of the user's specific preference between different objectives.

One technical solution is to compute an outranking weights between pairs of solutions. The outranking weight, noted as $w(f^i, f^j)$, may be indicative of a measurement of preference between the two solutions although the two solutions may not dominate one another. In some exemplary embodiments, an outranking weight may be computed between every ordered pair of solutions (e.g., computing $w(f^i, f^j)$ as well as $w(f^j, f^i)$).

In some exemplary embodiments, the outranking weight may be based on a k-domination relation, noted as $\prec_k$. A first solution $f^i$ may k-dominate a second solution $f^j$ if a ratio between a number of objectives in which $f^i$ is preferable over $f^j$ and a number of objectives in which $f^j$ is preferable over $f^i$ is no more than k. A formal definition of one k-domination relation may be $f^i \prec_k f^j$ if $$\frac{n_w(f^i, f^j)}{n_b(f^i, f^j)},$$

where $n_w(f^i, f^j) = |\{x | f_x^i < f_x^j\}|$ and $n_b(f^i, f^j) = |\{x | f_x^i > f_x^j\}|$. In some cases, a solution does not k-dominate itself. In some exemplary embodiments, the outranking weight may be based on a maximal k or minimal k for which the first solution k-dominates the second solution (or vice versa).

In some cases, the outranking weight may be based on credibility index, noted as $\sigma()$. The credibility index may be based on a concordance value and on discordance indexes. The credibility index may quantifies the certainty of the assertion that a outranks b. In some exemplary embodiments, the credibility index may be defined as follows:

$$\sigma(a, b) = c(a, b) \cdot \prod_{j: d(p,v)j(a,b) > c(q)(a,b)} \frac{1 - d_{(p,v)j}(a, b)}{1 - c_{(q)}(a, b)}.$$

In some exemplary embodiments, $c_{(q)}(a,b)$ may be the concordance value. Concordance value may be defined as a fraction of objectives in which the values in solution a outrank the values in solution b with a tolerated error of q. $d_{(p,v)j}(a,b)$ may be a discordance index. The discordance index may be a complementary measure to the concordance value. Discordance index for the j-th coordinate may account for losses between $p_j$ to $v_j$. Losses beyond the latter parameter, which may be entitled the veto threshold, would eliminate the outranking assertion. In other words, $d_{(p,v)j}(a, b) \in [0,1]$ is proportional to the loss in $[-p_j, -v_j]$—if the loss exceeds $-v_j$ then $d_j = 1$ and veto is applied; if the loss does not exceed $-p_j$ then $d_j = 0$. In some exemplary embodiments, $p_j$, $q_j$, $v_j$ may be parameters of the credibility index.

In some exemplary embodiments, the outranking weight may be based on fuzzy membership functions, $\mu_b$, $\mu_w$ as a fuzzy notion of $n_b$, $n_w$. In some exemplary embodiments, the outranking weight may be computed using the following formula:

$$F(a, b) = \begin{cases} 0 & \sigma(a, b) < \theta_{LA} \\ F_{GP} & \text{otherwise} \end{cases},$$

where $\sigma()$ is a credibility index, $\theta_{LA}$ is a loss aversion threshold (e.g., a parameter) and $$F_{GP}(a, b) = \min\left\{0, \frac{n_b - n_w}{m}\right\},$$

where $n_b$, $n_w$ are defined either directly or using a fuzzy notion and m is a number of objectives in the multi objective problem.

A subset of solutions may be selected based upon a defensive criteria with respect to the outranking weights. The defensive criteria may relate to a number of solutions that outrank the subset based on the outranking weights. A solution f may be said to outrank a subset s, if for every solution $f' \in s$, $w(f', f) > w(f, f')$.

Another technical solution may be selected based upon an offensive criteria with respect to the outranking weights. The offensive criteria may relate to a number of solutions that are outranked by the subset based on the outranking weights. A solution f may be said to be outranked by a subset s, if there exists a solution in the subset, $f' \in s$, that outranks f (e.g., $\exists f' \in s: w(f', f) > w(f, f')$).

Yet another technical solution may be to utilize either offensive or defensive criteria based on a risk preference of a user. In case of a Loss Aversion (LA) risk preference, the selection may be based on the defensive criteria. In case of a Gain Prone (GP) risk preference, the selection may be based on the offensive criteria. In some exemplary embodiments, the risk may not refer to uncertainty, but rather to losing or gaining objectives in which the solution is preferable over the others. In some exemplary embodiments, the risk preference may explicitly provided by the user, deduced in view of a behavior of the user, or the like.

Yet another technical solution may be to partition the set of solutions into a plurality of partitions. Each partition may be processed independently to identify a subset of the partition. The subsets may be aggregated together and provided to the user. In some exemplary embodiments, the disclosed subject matter may require computing for each pair of solutions a outranking weight. Partitioning the set into partitions (which may or may not be disjoint from one another) may reduce complexity of the computation from $O(N^2)$ to $m \cdot O(n^2)$, where N, the size of the set of solutions, is substantially larger than n, the approximated size of each partition. In some exemplary embodiments, the partitioning may be performed using a clustering algorithm such as but not limited to k-means clustering.

Referring now to FIG. 1 showing a flowchart diagram of a method, in accordance with some exemplary embodiments of the disclosed subject matter.

In Step 110, a set of solutions to a multi-objective problem is obtained. The set of solutions may be an efficient frontier. In some exemplary embodiments, each solution may by a non-dominated solution out of potential solutions to the multi-objective problem. In some exemplary embodiments, the set of solutions are automatically determined using an MCDM system.

In Step 120, a risk preference of the user may be obtained. The user may provide an explicit indication of his or her risk preference. Additionally or alternatively, the risk preference may be determined based on observed decisions of the user. In some exemplary embodiments, the risk preference may be a loss aversion risk preference. Additionally or alternatively, the risk preference may be gain prone risk preference.

In Step 130, the set of solutions may be partitioned into a plurality of partitions. The partitions may or may not be disjoint. Each partition may be processed independently. In some exemplary embodiments, Steps 140 and 150 are performed independently for each partition and the subsets of all the partitions may be aggregated into a single subset in Step 160. In some exemplary embodiments, the partitioning may be performed using k-means clustering algorithm. However additional algorithms may be used instead of or in addition thereto. In some exemplary embodiments, the partitioning may be aimed at creating partitions that are smaller than a predetermined threshold.

In Step 140, outranking weights may be computed for each pair of solutions. In some exemplary embodiments, the outranking weights may be computed for (a,b) as well as for (b,a). In some exemplary embodiments, the outranking weight may be computed based on a k-domination relation. The k-domination relation may be used to define a k-optimal solution as a solution for which no other solution k-dominates over it. In some exemplary embodiments, the outranking weight may be computed based on a degree of k optimality. The degree of k optimality for a solution is a maximal k for which the solution is k-optimal. The "resistance" of a given solution increases as its degree of optimality increases, and therefore, a solution with a larger degree is more likely to be preferred over others. In some exemplary embodiments, the outranking weight may be computed using the following formula:

$$w(a, b) = \frac{1}{\min_k (a \prec_k b)}.$$

Additionally or alternatively, the outranking weight may be computed using the following formula: $w(a,b) = \max_k (a \prec_k b)$. Additionally or alternatively, the outranking weight may be computed using a credibility index (e.g., $w(a,b) = \sigma(a,b)$). Additionally or alternatively, the outranking weight may be computed using the following formula:

$$w(a, b) = \begin{cases} 0 & \sigma(a, b) < \theta_{LA} \\ F_{GP} & \text{otherwise} \end{cases}.$$

It will be noted that the calculation of outranking weight is not limited to the above-mentioned, non-limiting, examples.

In some exemplary embodiments, in Step 140, an outranking graph may be computed. The outranking graph may comprise vertexes and edges. Each solution may be associated with a vertex in the graph and each pair of vertexes may be associated with a weighted edge. The weight of the edge may be the outranking weight. In some exemplary embodiments, the edges may be directed edges and each pair of edges may be connected using two edges.

In Step 150, a subset may be selected based on the outranking weights. In some exemplary embodiments, in case the risk preference is a loss aversion risk preference, a defensive criteria may be utilized to select the subset. In case the risk preference is a gain prone risk preference, an offensive criteria may be utilized to select the subset.

Selection of a subset based on the defensive criteria may be aimed at choosing a "top defensive subset" which is outranked altogether by as few as possible solutions. In some exemplary embodiments, a resistance degree may be defined for each solution with respect to a resisting set as follows:

$$deg(R, u) = \sum_{v \in R \setminus u} w(u, v).$$

The resistance degree of a set may be defined as the maximal degree of all solutions:

$$deg(R) = \max_u deg(R, u).$$

The selection of the subset may be performed by solving the following optimization problem:

$$\min_{|R| \geq N} res(R),$$

where N is a maximal threshold of the size of the selected subset. The optimization problem may be solved, for example, by solving the following linear programming problem: minimize t, subject to:

$$\sum_v sol[v] \geq N$$

and subject to:

$$\sum_v w(u, v) \cdot sol[v] \leq t \ \forall u.$$

sol[v] may denote a binary decision variable indicating whether solution v is a member of the subset.

Selection of a subset based on the offensive criteria may be aimed at choosing a "top offensive subset" which is outranks as many as possible solutions. For each set D a covering degree of a solution may be defined as $$cvr(D, v) = \begin{cases} 1 & v \in D \\ \max_{u \in D} w(u, v) & \text{otherwise} \end{cases}.$$

The covering degree of a set may be defined as $$cvr(D) = \sum_{\forall v} cvr(D, v).$$

In some exemplary embodiments, the choice of maximization, rather than summation, in the definition of cvr(D,v) may prevent choosing two similar solutions (the marginal gain of the second solution would be relatively small). An alternative approach may be to promote diversity by selecting solution-points with "victories" in all coordinates. The selection of the subset may be the solution to the following optimization problem:

$$\max_{|D| \leq N} cvr(D).$$

The optimization problem may be solved, for example, by solving the following linear programming problem: maximize $$\sum_u \sum_v w(u, v) \cdot cover[u][v],$$

subject to:

$$\sum_v sol[v] \leq N$$

and subject to:

$$\sum_v cover[v][u] \leq 1 \; \forall \; u$$

and subject to: cov er[v][u[ ]≤sol[v] ∀u∀v. sol[v] may denote a binary decision variable indicating whether solution v is a member of the subset. In some exemplary embodiments, cover[v][u]=1 may translate to selecting solution v to cover solution u.

It will be noted that a greedy algorithm may also be used to select the subset, either based on the defensive criteria or on the offensive criteria. It will be further noted that each criteria may result in a different subset selection. In some exemplary embodiments, two alternative subsets may be selected, one based on the defensive criteria and the other based on the offensive criteria, thereby allowing the user to select from both subsets. In some exemplary embodiments, in case the user's selection of a solution from the two subset adheres to a specific risk preference, the user's risk preference may be determined (Step 120) and used to determine which criteria to use. As an example, if the user selects in 90% of the times a solution that is comprised by the top defensive subset, it may be automatically determined that the user's risk preference is that of a loss aversion.

In Step 160, the subsets determined in Step 150 with respect to each partition may be aggregated together to a single subset. In case two a defensive subset and an offensive subset are selected for each partition, the defensive subsets may be aggregated to a single defensive subset and the offensive subsets may be aggregated to a single offensive subset. Additionally or alternatively, the defensive and offensive subsets may be aggregated to a single subset.

In Step 170, the subset may be outputted to the user. In some exemplary embodiments, the subset may be graphically displayed to the user. Additionally or alternatively, the user may select a single solution out of the subset and use that solution for his or her purposes. In some exemplary embodiments, the user may select several solutions.

It will be noted that the selection of the user may be monitored so as to determine the risk preference of the user to be used in the future at Step 120.

Referring now to FIG. 2 showing an apparatus, in accordance with some exemplary embodiments of the disclosed subject matter. An Apparatus 200 may be configured to generate new questions, in accordance with the disclosed subject matter. Additionally or alternatively, Apparatus 200 may be configured to perform the method depicted in FIG. 1.

In some exemplary embodiments, Apparatus 200 may comprise a Processor 202. Processor 202 may be a Central Processing Unit (CPU), a microprocessor, an electronic circuit, an Integrated Circuit (IC) or the like. Processor 202 may be utilized to perform computations required by Apparatus 200 or any of it subcomponents.

In some exemplary embodiments of the disclosed subject matter, Apparatus 200 may comprise an Input/Output (I/O) Module 204. I/O Module 204 may be utilized to provide an output to and receive input from a User 280, such as, for example a risk preference of User 280, selection of solutions out of the subset, parameter valuations, or the like.

In some exemplary embodiments, Apparatus 200 may comprise a Memory Unit 207. Memory Unit 207 may be a hard disk drive, a Flash disk, a Random Access Memory (RAM), a memory chip, or the like. In some exemplary embodiments Memory Unit 207 may retain program code operative to cause Processor 202 to perform acts associated with any of the subcomponents of the Apparatus 200.

Efficient Frontier Determinator (EFD) 210 may be configured to determine an efficient frontier with respect to a multi-objective problem. EFD 210 may be configured to automatically identify the Pareto optimal solutions to the multi-objective problem. In some exemplary embodiments, EFD 210 may provide a relatively large number of Pareto optimal solutions, such as over a hundred, over a thousand, or the like, making it hard or even impossible for a human user to effectively compare all the potential solutions and select the best solution based on his or her preferences. In some exemplary embodiments, EFD 210 may obtain the efficient frontier from an external source, such as an MCDM system, from a data repository, or the like.

Solutions Partition Module 220 may be configured to partition the set of solutions obtained by EFD 210. Solutions Partition Module 220 may be configured to create partitions that do not exceed a predetermined size limit.

User Preference Obtainer 230 may be configured to obtain a risk preference of User 280. User 280 may provide User Preference Obtainer 230 with his or her declared risk preference. Additionally or alternatively, User Preference Obtainer 230 may monitor selections by User 280 of past results to infer risk preference. Additionally or alternatively, the risk preference may be inferred from other activities performed by User 280. Additionally or alternatively, a declared risk preference may be compared with an exhibited risk preference to determine whether or not the declaration should be trusted. In case the declaration is inconsistent with the behavior of User 280, User Preference Obtainer 230 may decide to use both the exhibited risk preference as well as the declared risk preference. In some exemplary embodiments, the declared risk preference may be disregarded if inconsistent with the behavior of User 280.

Outranking Weight Calculator 240 may be configured to calculate outranking weight between two solutions. In some exemplary embodiments, Outranking Weight Calculator 240 may further be configured to create an outranking graph to be used for subset selection.

Defensive Set Selector 250 and Offensive Set Selector 260 may be configured to select a subset of the solutions obtained by EFD 210, based on defensive and offensive criteria, respectively. In some exemplary embodiments, Selectors 250 and 260 may be configured to select a subset for a partition and aggregate the subsets for all partitions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computerized apparatus having a processor, the processor being adapted to perform the steps of:
   obtaining a set of solutions to a multi-objective problem, wherein each solution is a non-dominated solution;
   computing outranking weights for each pair of solutions;
   selecting a subset of the set of solutions based upon a defensive criteria in with respect to the outranking weights, wherein the defensive criteria relates to a number of solutions that outrank the subset; and
   outputting the subset of the set of solutions.

2. The computerized apparatus of claim 1, wherein the processor being adapted to perform: selecting a second subset of the set of solutions based upon an offensive criteria with respect to the outranking weights, wherein the offensive criteria relates to a number of solutions that the subset outranks.

3. The computerized apparatus of claim 2, wherein the processor being adapted to perform: selecting between using the defensive criteria and the offensive criteria based on a risk preference of a user.

4. The computerized apparatus of claim 3, wherein the risk preference is either a loss aversion risk preference or a gain prone risk preference.

5. The computer-implemented method of claim 1, wherein the outranking weight is computed by a following formula:

$$\frac{1}{\min_k (f^i \prec_k f^j)},$$

where $f^i$ is the first solution, $f^j$ is the second solution, and $\prec_k$ is a k-domination relation.

6. The computer-implemented method of claim 1, wherein the outranking weight is computed by a following formula:

$$\max_k (f^i \prec_k f^j),$$

where $f^i$ is the first solution, $f^j$ is the second solution, and $\prec_k$ is a k-domination relation.

7. The computer-implemented method of claim 1, wherein the outranking weight is computed by a following formula: $\sigma(f^i, f^j)$, where $f^i$ is the first solution, $f^j$ is the second solution, and $\sigma(\ )$ is a credibility index that is based on a concordance value and on discordance indexes.

8. The computer-implemented method of claim 1, wherein said selecting the subset is performed by solving a following linear programming problem: minimize t, subject to:

$$\sum_v sol[v] \geq N_{rec}$$

and subject to:

$$\sum_v w(u, v) \cdot sol[v] \leq t \; \forall \, u,$$

wherein $N_{rec}$ is a predetermined maximal size of the subset, wherein w(u,v) is a weight between solutions u and v, wherein sol[v] is a binary decision variable indicating whether solution v is a member of the subset.

9. The computerized apparatus of claim 1, wherein the processor being adapted to perform: partitioning the set of solutions into a plurality of partitions, wherein said computing and said selecting are performed several times, each time with respect to a different partition.

10. A method comprising:
   obtaining a set of solutions to a multi-objective problem, wherein each solution is a non-dominated solution;
   computing, by a processor, outranking weights for each pair of solutions;
   selecting a subset of the set of solutions based upon a defensive criteria in with respect to the outranking weights, wherein the defensive criteria relates to a number of solutions that outrank the subset; and
   outputting the subset of the set of solutions.

11. The method of claim 10 further comprising: selecting a second subset of the set of solutions based upon an offensive criteria with respect to the outranking weights, wherein the offensive criteria relates to a number of solutions that the subset outranks.

12. The method of claim 11, further comprising selecting between using the defensive criteria and the offensive criteria based on a risk preference of a user.

13. The method of claim 12, wherein the risk preference is either a loss aversion risk preference or a gain prone risk preference.

14. The method of claim 10, wherein the outranking weight is computed by a following formula:

$$\frac{1}{\min_k (f^i \prec_k f^j)},$$

where $f^i$ is the first solution, $f^j$ is the second solution, and $\prec_k$ is a k-domination relation.

15. The method of claim 10, wherein the outranking weight is computed by a following formula:

$$\max_k (f^i \prec_k f^j),$$

where $f^i$ is the first solution, $f^j$ is the second solution, and $\prec_k$ is a k-domination relation.

16. The method of claim 10, wherein the outranking weight is computed by a following formula: $\sigma(f^i, f^j)$, where $f^i$ is the first solution, $f^j$ is the second solution, and $\sigma(\ )$ is a credibility index that is based on a concordance value and on discordance indexes.

17. The method of claim 10, wherein said selecting the subset is performed by solving a following linear programming problem: minimize t, subject to:

$$\sum_v sol[v] \geq N_{rec}$$

and subject to:

$$\sum_v w(u, v) \cdot sol[v] \leq t \ \forall \ u,$$

wherein $N_{rec}$ is a predetermined maximal size of the subset, wherein $w(u,v)$ is a weight between solutions u and v, wherein sol[v] is a binary decision variable indicating whether solution v is a member of the subset.

18. The method of claim 10 further comprising partitioning the set of solutions into a plurality of partitions, wherein said computing and said selecting are performed several times, each time with respect to a different partition.

19. A computer program product comprising a computer readable storage medium retaining program instructions, which program instructions when read by a processor, cause the processor to perform a method comprising:
  obtaining a set of solutions to a multi-objective problem, wherein each solution is a non-dominated solution;
  computing outranking weights for each pair of solutions;
  selecting a subset of the set of solutions based upon a defensive criteria in with respect to the outranking weights, wherein the defensive criteria relates to a number of solutions that outrank the subset; and
  outputting the subset of the set of solutions.

\* \* \* \* \*